United States Patent
Bunk (10) Patent No.: US 10,272,893 B2
(45) Date of Patent: Apr. 30, 2019

(54) SENSOR DEVICE FOR AN ELECTROMECHANICAL BRAKE BOOSTER, AND METHOD FOR ASCERTAINING A TORQUE LOSS OF AN ELECTROMECHANICAL BRAKE BOOSTER OF A BRAKING SYSTEM

(71) Applicant: Robert Bosch GmbH, Stuttgart (DE)

(72) Inventor: Michael Bunk, Leingarten (DE)

(73) Assignee: ROBERT BOSCH GMBH, Stuttgart (DE)

(*) Notice: Subject to any disclaimer, the term of this patent is extended or adjusted under 35 U.S.C. 154(b) by 140 days.

(21) Appl. No.: 15/311,022

(22) PCT Filed: Apr. 2, 2015

(86) PCT No.: PCT/EP2015/057286
§ 371 (c)(1),
(2) Date: Nov. 14, 2016

(87) PCT Pub. No.: WO2015/185243
PCT Pub. Date: Dec. 10, 2015

(65) Prior Publication Data
US 2017/0106850 A1    Apr. 20, 2017

(30) Foreign Application Priority Data

Jun. 4, 2014   (DE) .................. 10 2014 210 557

(51) Int. Cl.
*B60T 13/00*   (2006.01)
*B60T 13/74*   (2006.01)
(Continued)

(52) U.S. Cl.
CPC .......... *B60T 13/745* (2013.01); *B60T 13/142* (2013.01); *B60T 13/686* (2013.01)

(58) Field of Classification Search
CPC ..... B60T 13/745; B60T 13/142; B60T 13/686
(Continued)

(56) References Cited

U.S. PATENT DOCUMENTS

2009/0115242 A1   5/2009  Ohtani et al.
2015/0367824 A1*  12/2015 Betz ............... B60T 8/4095
                                                       701/70
(Continued)

FOREIGN PATENT DOCUMENTS

CN    101284530 A    10/2008
CN    102387950 A     3/2012
(Continued)

OTHER PUBLICATIONS

International Search Report dated Jun. 18, 2015, of the corresponding International Application PCT/EP2015/057286 filed Apr. 2, 2015.

*Primary Examiner* — Max H Noori
(74) *Attorney, Agent, or Firm* — Norton Rose Fulbright US LLP; Gerard Messina (57) ABSTRACT

A method for ascertaining a torque loss of an electromechanical brake booster of a braking system, including ascertaining when a user of the braking system requests a brake pressure build-up in at least one wheel brake cylinder of the braking system, using the electromechanical brake booster, by actuating a brake actuation element of the braking system; and optionally determining an actual value with regard to the torque loss of the motor of the electromechanical brake booster, taking into account at least one provided sensor variable with regard to a motor torque of a motor of the electromechanical brake booster, a change over time of a rotation speed of the motor of the electromechanical brake booster, and/or a master brake cylinder pressure that is present in a master brake cylinder of the braking system.

16 Claims, 1 Drawing Sheet

(51) Int. Cl.
  *B60T 13/14*   (2006.01)
  *B60T 13/68*   (2006.01)
(58) Field of Classification Search
  USPC .................................................. 73/862.193
  See application file for complete search history.

(56) References Cited

U.S. PATENT DOCUMENTS

2016/0137175 A1* 5/2016 Bunk ...................... B60T 7/042
                                                                701/78
2016/0272171 A1* 9/2016 Bunk ...................... B60W 10/12
2017/0267218 A1* 9/2017 Bunk ...................... B60T 7/042

FOREIGN PATENT DOCUMENTS

| DE | 19536695 A1 | 4/1997 |
| DE | 102013225746 A1 | 6/2015 |
| JP | 2008162464 A | 7/2008 |
| JP | 2010195110 A | 9/2010 |
| JP | 2012101676 A | 5/2012 |
| WO | 2009077331 A1 | 6/2009 |
| WO | 2012053339 A1 | 4/2012 |

* cited by examiner

SENSOR DEVICE FOR AN ELECTROMECHANICAL BRAKE BOOSTER, AND METHOD FOR ASCERTAINING A TORQUE LOSS OF AN ELECTROMECHANICAL BRAKE BOOSTER OF A BRAKING SYSTEM

FIELD

The present invention relates to a sensor device for an electromechanical brake booster of a braking system and a controller for an electromechanical brake booster. Moreover, the present invention relates to a method for ascertaining a torque loss of an electromechanical brake booster of a braking system, and a method for operating an electromechanical brake booster of a braking system.

BACKGROUND INFORMATION

German Patent Application No. 102 01 322 574 6.5 describes a method and a control unit for controlling a vehicle braking system. To ensure a desired braking effect of at least one wheel brake of the vehicle braking system, an actuator of the vehicle braking system, in particular an electromechanical brake booster of the braking system, is to be controlled. Controlling the electromechanical brake booster should also take into account a torque loss of the electromechanical brake booster which is to be estimated for the run time, depending on the operating point.

SUMMARY

The present invention provides a sensor device for an electromechanical brake booster of a braking system, a controller for an electromechanical brake booster of a braking system, a method for ascertaining a torque loss of an electromechanical brake booster of a braking system, and a method for operating an electromechanical brake booster of a braking system.

The present invention provides easily implementable options for adjusting a torque loss of an electromechanical brake booster at least once during its use in an on-board braking system. Due to adjusting the torque loss at least once, when the newly set torque loss is subsequently taken into account for controlling the electromechanical brake booster, the operation of the latter may be optimized in such a way that its advantageous operation is ensured, even during a comparatively long operating period of the electromechanical brake booster and/or extreme environmental conditions/operating parameters of the electromechanical brake booster. As explained in greater detail below, high pressure peaks (which customarily occur frequently during recirculation) and a delayed suction of brake fluid from a brake fluid reservoir into the master brake cylinder (which occurs during an autonomous pressure build-up according to the related art) may also be prevented with the aid of the present invention. The present invention thus also ensures improved ease of operation for the user of the braking system in conjunction with the present invention.

It is also pointed out that with the aid of the present invention, manufacturing-related deviations of the torque loss of the particular electromechanical brake booster from a standard torque loss of the brake booster type are also ascertainable, and may thus be remedied by also taking them into account in the control of the electromechanical brake booster. The present invention thus allows cost-effective manufacture of partial areas of electromechanical brake boosters in large-scale production, without the deviations of the braking torques, which occur in the process, impairing subsequent operation of the electromechanical brake booster.

The options which are achievable with the aid of the present invention for adjusting a torque loss of an electromechanical brake booster at least once allow a more accurate and error-free determination of the torque loss, compared to a mere estimation. Manufacturing-related deviations cannot be eliminated by mere estimation, but this problem may be compensated for with the aid of the present invention.

In one advantageous specific embodiment, the electronic device is additionally designed for recognizing, based on the at least one provided signal, whether the requested brake pressure build-up in the at least one wheel brake cylinder, using the electromechanical brake booster, corresponds to at least one predefined standard mode. In this case, the electronic device is preferably designed for determining the actual variable only if the requested brake pressure build-up in the at least one wheel brake cylinder, using the electromechanical brake booster, corresponds to the at least one predefined standard mode. It may thus be ensured that operating conditions which deviate from a standard operation of the electromechanical brake booster, such as an emergency braking situation and/or recirculation during the requested brake pressure build-up, are reliably recognizable. This ensures a reliable determination of the actual variable.

For example, the at least one provided signal may include at least one first piece of information concerning a speed and/or an intensity of the actuation of the brake actuation element by the user of the braking system. The electronic device may then optionally be designed for recognizing, based on the first piece of information, whether an average actuation speed, a maximum actuation speed, an average change in the actuation speed over time, a maximum change in the actuation speed over time, an average actuation intensity, and/or a maximum actuation intensity are/is within at least one value range which is predefined as the at least one standard mode. Otherwise, emergency braking may be recognized based on extreme values for the variables listed here, so that the determination of the actual variable is preventable in such a situation.

Likewise, the at least one provided signal may also include at least one second piece of information concerning an active operation of at least one pump of the braking system and/or at least one valve of the braking system. In this case the electronic device may advantageously be designed for disallowing the at least one standard mode, taking into account the second piece of information, if the active operation of the at least one pump and/or of the at least one valve occurs during the requested brake pressure build-up in the at least one wheel brake cylinder, using the electromechanical brake booster. A recirculation with the aid of the at least one pump and/or a displacement of brake fluid via the at least one valve thus cannot result in distortion of the actual variable.

As an alternative or in addition to the specific embodiments described above, the at least one provided signal may also include at least one third piece of information concerning a prior accelerator pedal actuation. In one preferred specific embodiment, the electronic device is therefore designed for disallowing at least one standard mode, taking into account the third piece of information, if a time interval between the accelerator pedal actuation and the requested brake pressure build-up in the at least one wheel brake cylinder, using the electromechanical brake booster, is less than a predefined minimum time interval. Based on the rapid changeover between the accelerator pedal actuation and the actuation of the brake actuation element, the electronic device may thus recognize an emergency braking situation, and optionally reset a new determination of the actual variable.

In another advantageous specific embodiment, the electronic device is designed for determining the actual variable with regard to the torque loss of the motor of the electromechanical brake booster, additionally taking into account at least one environmental condition and/or at least one operating parameter of the electromechanical brake booster as the actual variable which is a function of the at least one environmental condition and/or the at least one operating parameter. In particular, characteristic curves and/or characteristic maps for the torque loss may be established in this way. A suitable actual variable may thus be determined, even under extreme environmental conditions and/or uncommon operating parameters, and may also be taken into account during a subsequent control of the electromechanical brake booster and under the same conditions.

In addition, a controller for an electromechanical brake booster of a braking system which includes this type of sensor device provides the advantages described above.

In one advantageous specific embodiment, the controller, at least for autonomous braking, an emergency brake application, a driver assistance function, braking with an underlying control of an ABS/ESP system of the braking system, a recirculation pump operation, an evacuation of the master brake cylinder of the braking system, and/or a blending operation, is designed for controlling at least the electromechanical brake booster, taking into account the at least one actual variable determined by the sensor device. The operations described here are thus adaptable to the instantaneously present torque loss of the electromechanical brake booster.

In addition, carrying out the corresponding method for ascertaining a torque loss of an electromechanical brake booster of a braking system provides the advantages described above. The method is refinable according to the above-described specific embodiments of the sensor device.

Furthermore, the above-described advantages are also achievable by carrying out the corresponding method for operating an electromechanical brake booster of a braking system. In this case as well, the method is refinable according to the above-described exemplary embodiments.

BRIEF DESCRIPTION OF THE DRAWINGS

Further features and advantages of the present invention are explained below with reference to the figures.

DETAILED DESCRIPTION OF EXAMPLE EMBODIMENTS

Figure 1:
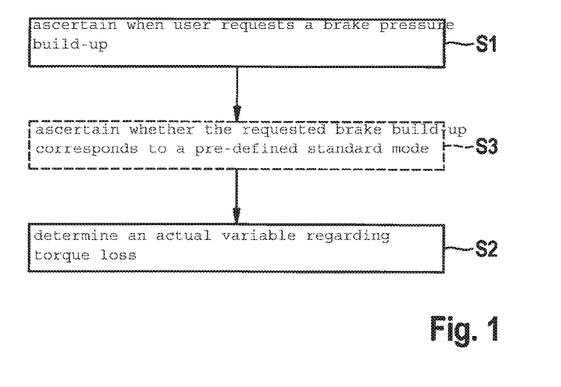
FIG. 1 shows a flow chart for explaining one specific embodiment of the method for ascertaining a torque loss of an electromechanical brake booster of a braking system.

FIG. 1 shows a flow chart for explaining one specific embodiment of the method for ascertaining a torque loss of an electromechanical brake booster of a braking system.

The method described below is suitable for ascertaining a torque loss $M_0$ of numerous different types of electromechanical brake boosters. In particular, torque loss $M_0$ of any brake booster including an electric motor, with the aid of which a booster force is (directly or indirectly) exertable on at least one displaceable piston of a master brake cylinder, may be ascertained by carrying out the method described below. The practicability of the method also is not limited to a certain type of braking system which is equipped with the electromechanical brake booster. Likewise, it is pointed out that the method may be carried out, without the type of vehicle/motor vehicle which is equipped with the particular electromechanical brake booster or braking system playing a role.

It is ascertained, in a method step S1, when a user of the braking system requests a brake pressure build-up in at least one wheel brake cylinder of the braking system, using the electromechanical brake booster, by actuating a brake actuation element of the braking system (a brake pedal, for example). For example, at least one signal of at least one brake actuation element sensor, in particular a pedal sensor, a rod travel sensor, a differential travel sensor, a driver brake pressure sensor, and/or a driver brake force sensor, may be evaluated for this purpose. As an alternative or in addition, for this purpose at least one signal which is output by an electronics system and/or a sensor system of the electromechanical brake booster may be examined with regard to an actuation and/or an operation of the electromechanical brake booster. Since the information necessary for carrying out method step S1 is generally already present in an electromechanical brake booster, additional use of the at least one brake actuation element sensor may thus also be dispensed with. In all of the cases listed here, with the aid of an appropriate signal evaluation it is reliably recognizable when the user of the braking system requests the brake pressure build-up in the at least one wheel brake cylinder of the braking system, using the electromechanical brake booster. This type of brake pressure build-up is preferably understood to mean a brake pressure build-up in which the electromechanical brake booster is used (only) for force-related assistance of the driver.

A further method step S2 is carried out during the requested brake pressure build-up in the at least one wheel brake cylinder, using the electromechanical brake booster. An actual variable with regard to torque loss $M_0$ of the motor of the electromechanical brake booster is determined in method step S2. The actual variable is determined taking into account at least one provided sensor variable $M_M$, p, and $\omega'$ with regard to a motor torque $M_M$ of a motor of the electromechanical brake booster, a change over time $\omega'$ of a rotation speed $\omega$ of the motor of the electromechanical brake booster, and/or a master brake cylinder pressure p that is present in a master brake cylinder of the braking system. In particular, torque loss $M_0$ of the motor itself may be determined as the actual variable. This may take place, for example, with the aid of Equation 1:

$$M_0 = M_M - k_1 * p - J * \omega \qquad \text{(Equation 1)}$$

where $k_1$ is a structurally-related first constant and J is a moment of inertia of the electromechanical brake booster.

Sensor variable $M_M$ with regard to motor torque $M_M$ may also be motor torque $M_M$ of the motor of the electromechanical brake booster itself. Motor torque $M_M$ may be detected, for example, via the measured current of the motor of the electromechanical brake booster.

The change over time $\omega'$ of rotation speed $\omega$ of the motor of the electromechanical brake booster may be ascertained either via a direct measurement of change over time $\omega'$ of rotation speed $\omega$, or via an ascertainment of rotation speed $\omega$ and Equation 2:

$$\dot{\omega} = \frac{d\omega}{dt} \quad \text{(Equation 2)}$$

Alternatively, change over time ω' of rotation speed ω of the motor of the electromechanical brake booster may also be ascertained via a derivation from a change over time q' of a requested setpoint volume flow q and Equation 3:

$$\frac{d\omega}{dt} = k_2 * \dot{q}, \quad \text{(Equation 3)}$$

where $k_2$ is a second structurally-specified constant. (Change over time q' of requested setpoint volume flow q is already known, in particular when the method described in German Patent Application No. 102 01 322 574 6.5 is used.)

Master brake cylinder pressure p may also be referred to as system pressure p. Master brake cylinder pressure p may be derived either by direct measurement or from some other variable.

In addition, motor torque $M_M$ of the motor of the electromechanical brake booster is derivable comparatively easily from an easily ascertainable or already known variable, such as a current of the motor. Equation 1 above may thus be computed relatively easily.

Carrying out method steps S1 and S2 described above allows a more accurate and/or more reliable ascertainment/redetermination of torque loss $M_0$ of the motor of the electromechanical brake booster (or the corresponding actual variable), in particular compared to the conventional estimation. By use of the knowledge of the actual variable/torque loss $M_0$ obtained in this way, during any further use of the electromechanical brake booster a targeted response may thus be made to age-related, environment-related, and/or manufacturing-related deviations of the particular electromechanical brake booster being examined. Thus, by carrying out method steps S1 and S2, it may be ensured that the instantaneous state of processes carried out with the aid of the electromechanical brake booster are/remain adapted, even over a fairly long operating period of the particular electromechanical brake booster. In addition, carrying out method steps S1 and S2 allows reliable use of the particular electromechanical brake booster, even when it has minor structural deviations due to the manufacturing process. The method described here may thus also be utilized for simplifying a manufacturing process for an electromechanical brake booster and/or for using less expensive materials in the manufacture of the electromechanical brake booster. With the aid of the method described here, it is thus possible to lower manufacturing costs for the particular electromechanical brake booster. In particular, by carrying out at least method steps S1 and S2 at the end of the assembly line, standard-compliant operation of the electromechanical brake booster may be ensured despite a simple manufacturing process and/or inexpensive materials.

In one preferred specific embodiment of the method, determining the actual variable with regard to torque loss $M_0$ of the motor of the electromechanical brake booster takes place in method step S2 while additionally taking into account at least one environmental condition and/or at least one operating parameter of the electromechanical brake booster. In this case, the actual variable is determined as the actual variable which is a function of the at least one environmental condition and/or the at least one operating parameter. For example, the actual variable may be determined as a function of at least one temperature T (of the electromechanical brake booster and/or in at least a partial surroundings of the electromechanical brake booster), at least one first variable with regard to manufacturing-related tolerances, and/or at least one second variable x2 with regard to wear of the electromechanical brake booster as the at least one environmental condition. As an alternative or in addition, for this purpose the actual variable may be determined as a function of a movement direction of the motor of the electromechanical brake booster, a movement speed/angular velocity φ' of the motor of the electromechanical brake booster, and/or a load on the motor of the electromechanical brake booster as the at least one operating parameter. When the method is carried out, in this case it is automatically taken into account that torque loss $M_0$ of the electromechanical brake booster may have a dependency on the movement direction of the motor of the electromechanical brake booster, the movement speed/angular velocity φ' of the motor of the electromechanical brake booster, the load on the motor of the electromechanical brake booster, the at least one temperature T, manufacturing-related tolerances of the electromechanical brake booster, and the wear of the electromechanical brake booster. In particular, characteristic curves and/or characteristic maps for the at least one actual variable with regard to the at least one changing environmental condition and/or the at least one varying operating parameter may be established by carrying out method step S2 multiple times for unequal environmental conditions and/or different operating parameters. This allows accurate knowledge of torque loss $M_0$, even in different operating situations of the electromechanical brake booster.

An optional method step S3 may also be carried out between method steps S1 and S2. In method step S3, during the requested brake pressure build-up in the at least one wheel brake cylinder, using the electromechanical brake booster, it is ascertained whether the requested brake pressure build-up in the at least one wheel brake cylinder, using the electromechanical brake booster, corresponds to at least one predefined standard mode. In other words, in method step S3 it is examined whether an operating range of the requested actuation of the electromechanical brake booster for carrying out the requested brake pressure build-up is in at least one predefined standard operating range. If the requested brake pressure build-up in the at least one wheel brake cylinder, using the electromechanical brake booster, corresponds to the at least one predefined standard mode (standard operating range), preferably only the actual variable is determined (by carrying out method step S2). In contrast, if it is determined in method step S3 that the requested brake pressure build-up in the at least one wheel brake cylinder, using the electromechanical brake booster, differs from the at least one predefined standard mode (standard operating range), the method may be terminated or method step S1 may be repeated (instead of carrying out method step S2).

Carrying out method step S3 between method steps S1 and S2 is advantageous due to the fact that, if the requested brake pressure build-up, additionally using the electromechanical brake booster, corresponds to the at least one predefined standard mode/standard operating range, a reliable redetermination/ascertainment of the actual variable with regard to torque loss $M_0$ of the motor of the electromechanical brake booster is (almost) always ensured. An unusual braking situation, such as an emergency brake application and/or an activation of some other braking system component, may thus not result in errors in redetermining/ascertaining torque loss $M_0$ of the motor (or the corresponding actual variable).

The at least one predefined standard mode/standard operating range may be characterized in that the brake pressure build-up requested by the user of the braking system by actuating the brake actuation element, with the additional use of the electromechanical brake booster, is to be carried out without an interaction with at least one further component of the particular braking system, in particular without an interaction with at least one component of an ABS/ESP system of the particular braking system (for example, at least one pump and/or at least one valve of the braking system). In method step S3 it may thus be ascertained, for example, whether an active operation of at least one pump of the braking system and/or of at least one valve of the braking system occurs during the requested brake pressure build-up (in the at least one wheel brake cylinder, using the electromechanical brake booster). It is optionally possible for the at least one standard mode/standard operating range to be disallowed, and for method step S2 to not be carried out.

Likewise, it may also be ascertained in method step S3 whether an average actuation speed of the actuation of the brake actuation element (by the user), a maximum actuation speed of the actuation of the brake actuation element, an average change over time of the actuation speed of the actuation of the brake actuation element, a maximum change over time of the actuation speed of the actuation of the brake actuation element, an average actuation intensity of the actuation of the brake actuation element, and/or a maximum actuation intensity of the actuation of the brake actuation element are/is within at least one value range which is predefined as the at least one standard mode (standard operating range). If the average actuation speed, the maximum actuation speed, the average change over time of the actuation speed, the maximum change over time of the actuation speed, the average actuation intensity, and/or the maximum actuation intensity are/is outside the at least one predefined value range, the method may be terminated or method step S1 may be repeated (instead of carrying out method step S2). However, if the average actuation speed, the maximum actuation speed, the average change over time of the actuation speed, the maximum change over time of the actuation speed, the average actuation intensity, and/or the maximum actuation intensity are/is within the at least one predefined value range, method step S2 is carried out subsequent to method step S3. Based on the average actuation speed, the maximum actuation speed, the average change over time of the actuation speed, the maximum change over time of the actuation speed, the average actuation intensity, and/or the maximum actuation intensity, an emergency brake application is reliably recognizable as such. It may thus be reliably recognized in method step S3 whether the requested brake pressure build-up is an emergency brake application, during which a reliable determination of the actual variable is often not possible.

As an alternative or in addition, it may also be ascertained in method step S3 whether a time interval between a prior accelerator pedal actuation and the requested brake pressure build-up in the at least one wheel brake cylinder, using the electromechanical brake booster, is less than a predefined minimum time interval. If the time interval between the accelerator pedal actuation and the requested brake pressure build-up in the at least one wheel brake cylinder, using the electromechanical brake booster, is less than the predefined minimum time interval, the at least one standard mode/standard operating range may be disallowed. In addition, a rapid changeover between an accelerator pedal actuation and a requested brake pressure build-up indicates an emergency braking situation. When a time interval between the accelerator pedal actuation and the requested brake pressure build-up in the at least one wheel brake cylinder, using the electromechanical brake booster, is less than the predefined minimum time interval, it is therefore advantageous to terminate the method or repeat method step S1 (instead of carrying out method step S2). Correspondingly, at least one signal of at least one surroundings sensor may also be evaluated with regard to an emergency braking situation.

In one refinement of the method described here, when method step S2 is carried out, a two-step model for torque loss $M_0$ may also be considered. It may be taken into account that torque loss $M_0$ is a function of a model-based torque loss $M_{0m}$ and an (age- and/or environment-related) change $\Delta M$ in torque loss $M_0$ according to Equation 4:

$$M_0 = f(M_{0m}, \Delta M) \qquad \text{(Equation 4)}$$

In the simplest case, torque loss $M_0$ results as the sum of model-based torque loss $M_{0m}$ and (age- and/or environment-related) change $\Delta M$ in torque loss $M_0$ according to Equation 5:

$$M_0 = M_{0m} + \Delta M \qquad \text{(Equation 5)}$$

Model-based torque loss $M_{0m}$ is obtained by determining basic influences, such as the movement direction of the motor of the electromechanical brake booster, the movement speed/angular velocity $\varphi'$ of the motor of the electromechanical brake booster, and the load on the motor of the electromechanical brake booster. For determining model-based torque loss $M_{0m}$, for example a model-based component which maps primarily design-specific properties and is valid for nominal conditions may be stored on a memory unit. Modeling of model-based torque loss $M_{0m}$ may take place based on nominal data.

Wear of the electromechanical brake booster or various environmental conditions may be determined via the (age- and/or environment-related) change $\Delta M$ in torque loss $M_0$ (taking into account relevant influencing parameters in the driving range).

Thus, according to Equation 6, torque loss $M_0$ is a function of master brake cylinder pressure p, angular velocity $\varphi'$, the at least one temperature T, and the at least one second variable x2 with regard to the wear of the electromechanical brake booster:

$$M_0 = f(p, \varphi', T, x2) \qquad \text{(Equation 6)}$$

According to Equation 7, model-based torque loss $M_{0m}$ is a function of the following variables:

$$M_{0m} = f(p, \varphi') \qquad \text{(Equation 7)}$$

Change $\Delta M$ in torque loss $M_0$ is preferably ascertained in method step S2. (Age- and/or environment-related) change $\Delta M$ in torque loss $M_0$ includes the deviation of the model-based component in comparison to the actual behavior, as well as the influence of nonmodel-based influencing parameters, such as the at least one temperature T and the at least one second variable x2 with regard to the wear of the electromechanical brake booster. Thus, Equation 8 results in the following for the (age- and/or environment-related) change $\Delta M$ in torque loss $M_0$:

$$\Delta M = f(p, \varphi', T, x2) \qquad \text{(Equation 8)}$$

Change $\Delta M$ in torque loss $M_0$ may also be referred to as manufacturing variation. This component may be ascertained and/or prepared for the run time during each driver-induced pressure build-up (preferably in the at least one standard mode/standard operating range). As explained in greater detail below, the electromechanical brake booster may thus always be advantageously used, in particular for cooperating with at least one other braking system component.

Figure 2:
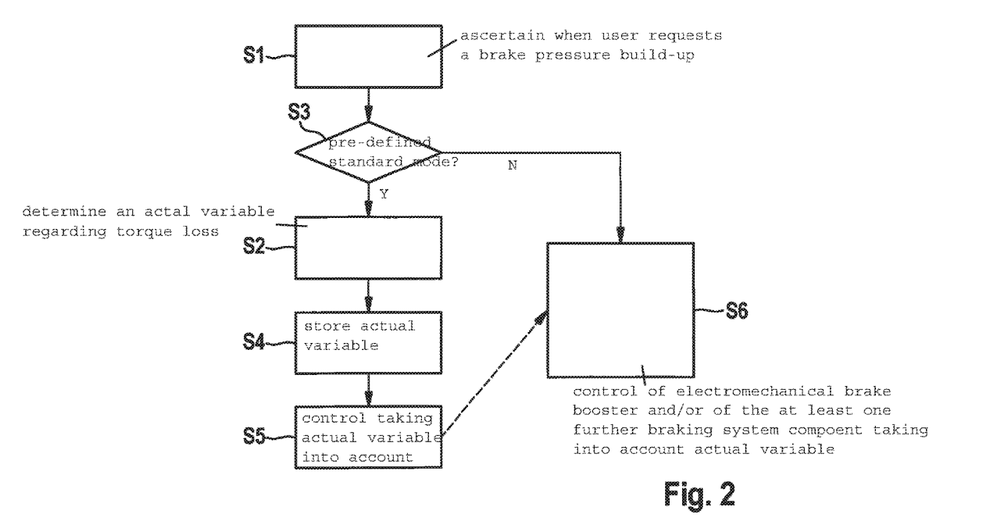
FIG. 2 shows a flow chart for explaining one specific embodiment of the method for operating an electromechanical brake booster of a braking system.

FIG. 2 shows a flow chart for explaining one specific embodiment of the method for operating an electromechanical brake booster of a braking system.

The method schematically depicted in FIG. 2 includes method steps S1 through S3 already described above. In the specific embodiment in FIG. 2, if the requested brake pressure build-up in the at least one wheel brake cylinder, using the electromechanical brake booster, corresponds to the at least one predefined standard mode/standard operating range, only the actual variable is determined (by carrying out method step S3). In contrast, if it is recognized in method step S3 that the requested brake pressure build-up differs from the at least one standard mode/standard operating range, carrying out of method step S2 is prevented.

Likewise, in the specific embodiment in FIG. 2, the actual variable with regard to torque loss $M_0$ of the motor of the electromechanical brake booster, additionally taking into account at least one environmental condition and/or at least one operating parameter of the electromechanical brake booster, may also be determined as the actual variable which is a function of the at least one environmental condition and/or the at least one operating parameter. This may also be referred to as ascertaining/determining the actual variable with regard to torque loss $M_0$ of the motor of the electromechanical brake booster for a certain operating point of the particular braking system.

The actual variable is stored on a memory unit in a further method step S4. Storing the data ascertained in method step S2 on the memory unit allows the data to be used for a subsequent targeted control of the electromechanical brake booster and/or at least one further braking system component. In particular, the actual variable obtained in method step S2 may be stored on the memory unit as part of a characteristic curve and/or a characteristic map. The memory unit may be an EEPROM, for example.

After carrying out method step S2 at least once for the at least one-time ascertainment of the actual variable with regard to torque loss $M_0$ of the electromechanical brake booster, the at least one determined actual variable may subsequently be taken into account in a further method step S5, at least for controlling the electromechanical brake booster and/or at least one further braking system component for assisting the requested brake pressure build-up in the standard mode/standard operating range. The at least one actual variable may be read out from the memory unit and appropriately taken into account as a function of all relevant environmental conditions and/or operating parameters. Manufacturing-related fluctuations as well as environmental influences on the electromechanical brake booster may be reliably compensated for, carrying out method step S5, by also taking into account the at least one actual variable. The method in FIG. 2 in particular also allows reliable operation of the particular electromechanical brake booster, even when it is manufactured on a large scale.

In addition, if it is recognized in method step S3 that the requested brake pressure build-up in the at least one wheel brake cylinder, using the electromechanical brake booster, differs from the at least one predefined standard mode/standard operating range, a method step S6 is carried out. Control of the electromechanical brake booster and/or of the at least one further braking system component, also taking into account the at least one (previously determined) actual variable, takes place in method step S6, also for braking operations outside the at least one predefined standard mode/standard operating range. For example, the at least one actual variable may be taken into account for autonomous braking, an emergency brake application, a driver assistance function, braking with an underlying control of the ABS/ESP system of the braking system, a recirculation pump operation, an evacuation of the master brake cylinder of the braking system, and/or a blending operation (during control of the electromechanical brake booster and/or the at least one further braking system component).

Autonomous braking may also be understood to mean power braking, braking without actuation of the brake actuation element/brake pedal by a driver, braking without utilizing driver brake force, and/or an autonomous pressure build-up. Autonomous braking may be carried out with the aid of the electromechanical brake booster and/or with the aid of the ABS/ESP system, the at least one (previously determined) actual variable with regard to torque loss $M_0$ of the motor of the electromechanical brake booster also being taken into account. For carrying out the autonomous braking, a setpoint master brake cylinder pressure $p_0$ and a setpoint volume flow $q_0$ may initially be determined, as described in German Patent Application No. 102 01 322 574 6.5. Equations 9 and 10 may be used for this purpose:

$$\frac{dp_0}{dt} = \frac{k}{V - \pi\frac{d^2}{4}s} * \left(q_1 + q_2 + \pi\frac{d^2}{4}\frac{ds}{dt}\right) \text{ and} \quad \text{(Equation 9)}$$

$$q_0 = \pi\frac{d^2}{4}\frac{ds}{dt}, \quad \text{(Equation 10)}$$

where k is a constant, V is a master brake cylinder volume, d is a master brake cylinder diameter, and s is a displacement travel of a rod piston of the master brake cylinder. Variables $q_1$ and $q_2$ each represent a connection of a brake circuit to the master brake cylinder.

Motor torque $M_M$ to be provided by the motor of the electromechanical brake booster may subsequently be determined, taking into account the determined variables, according to Equation 11:

$$M_M = M_0 + k_1 * p_0 + J * k_2 * \dot{q}_0 \quad \text{(Equation 11)}$$

The (accurate and error-free) knowledge of torque loss $M_0$ thus significantly improves the quality of each control of the electromechanical brake booster (even when the ABS/ESP is also in operation).

Based on Equations 9 through 11, it is possible to implement numerous new functions. For example, for tracking the electromechanical brake booster, i.e., for obtaining setpoint master brake cylinder pressure $p_0$, motor torque $M_M$ may be set in such a way that Equation 12 applies:

$$\frac{dp_0}{dt} = 0 \quad \text{(Equation 12)}$$

In this way, a delayed suction of brake fluid is also preventable, and at the same time mechanical load on the individual components is reduced. Although a delayed suction of brake fluid from a brake fluid reservoir may customarily occur, for example during an evacuation of the master brake cylinder for an autonomous pressure build-up via the ESP system, this process is preventable by appropriately controlling the electromechanical brake booster.

Pressure/volume requests by a driver assistance system, optionally with underlying control of the ABS/ESP system, may also be improved by adjusting the operation of the electromechanical brake booster, taking into account the at least one previously determined actual variable. For example, pressure peaks during a recirculation pump operation may be prevented by appropriately controlling the electromechanical brake booster.

Equations 9 through 11 yield a relationship between a motor torque $M_M$ (drive torque) of the motor of the electromechanical brake booster and the pressure change in the master brake cylinder. A higher quality for the control of the electromechanical brake booster is achieved due to the additional knowledge of the actual variable/torque loss $M_0$. This also improves a possible interaction of the electromechanical brake booster with the ABS/ESP system of the braking system. In particular, this results in options for optimizing interactions between the electromechanical brake booster and the ABS/ESP system. In addition, the mechanical loads on the individual component of the braking system may be minimized. Robustness of the control is thus also improvable, so that a higher level of robustness in the interaction of the individual components of the braking system is achievable.

The methods described above may also be carried out with the aid of a sensor device for an electromechanical brake booster of a braking system. This type of sensor device includes an electronic device which is designed for recognizing, based on at least one provided signal, when a user of the braking system requests a brake pressure build-up in at least one wheel brake cylinder of the braking system, using the electromechanical brake booster, by actuating a brake actuation element of the braking system. In addition, during the requested brake pressure build-up in the at least one wheel brake cylinder, using the electromechanical brake booster, the electronic device is also designed for determining an actual variable with regard to a torque loss $M_0$ of the motor of the electromechanical brake booster, taking into account at least one provided sensor variable $M_M$, p, and ω' with regard to a motor torque $M_M$ of a motor of the electromechanical brake booster, a change over time ω' of a rotation speed ω of the motor of the electromechanical brake booster, and/or a master brake cylinder pressure p that is present in a master brake cylinder of the braking system, and subsequently storing and/or outputting the actual variable. With regard to further design options for the sensor device, reference is made to the above description of the methods.

The methods described above may also be carried out with the aid of a controller for an electromechanical brake booster of a braking system together with an appropriate sensor device.

It is pointed out that the sensor device and the controller, despite the significant difference between the mechanical and hydraulic time constants of the braking system, ensure advantageous cooperation between the mechanics and the hydraulics of the braking system. (The hydraulic time constants are generally in the range of a few milliseconds, while the mechanical time constants of an electromechanical brake booster, largely determined by its mass inertia and its time-discrete control, are significantly higher.) However, with the aid of the controller, the electromechanical brake booster is controllable in such a way that during each actuation of the brake actuation element (brake pedal), a driver braking intent is reliably convertible into a corresponding brake pressure build-up in the at least one wheel brake cylinder. Each vehicle deceleration requested by the driver is thus reliably implementable.

What is claimed is:

1. A sensor device for an electromechanical brake booster of a braking system, comprising:
    an electronic device wherein the electronic device is configured to: ascertain, based on at least one provided signal, when a user of the braking system requests by actuating a brake actuation element of the braking system, a brake pressure build-up in at least one wheel brake cylinder of the braking system using the electromechanical brake booster,
    determine, during the requested brake pressure build-up in at least one wheel brake cylinder using the electromechanical brake booster, an actual variable with regard to a torque loss of the motor of the electromechanical brake booster, taking into account at least one of: i) at least one provided sensor variable with regard to a motor torque of a motor of the electromechanical brake booster, ii) a change over time of a rotation speed of the motor of the electromechanical brake booster, and iii) a master brake cylinder pressure that is present in a master brake cylinder of the braking system, and subsequently at least one of store and output the actual variable.

2. The sensor device as recited in claim 1, wherein the electronic device is additionally designed to recognize, based on the at least one provided signal, whether the requested brake pressure build-up in the at least one wheel brake cylinder using the electromechanical brake booster corresponds to at least one predefined standard mode, and to determine the actual variable only if the requested brake pressure build-up in the at least one wheel brake cylinder using the electromechanical brake booster, corresponds to the at least one predefined standard mode.

3. The sensor device as recited in claim 2, wherein the at least one provided signal includes at least one first piece of information concerning at least one of an actuation speed and an intensity of the actuation of the brake actuation element by the user of the braking system, and the electronic device is designed for recognizing, based on the first piece of information, whether at least one of: i) an average actuation speed, ii) a maximum actuation speed, iii) an average change in the actuation speed over time, iv) a maximum change in the actuation speed over time, v) an average actuation intensity, and vi) a maximum actuation intensity, is within at least one value range which is predefined as the at least one standard mode.

4. The sensor device as recited in claim 2, wherein the at least one provided signal includes at least one second piece of information concerning an active operation of at least one of: i) at least one pump of the braking system, and ii) at least one valve of the braking system, and the electronic device is designed for disallowing the at least one standard mode, taking into account the second piece of information, if the active operation of the at least one of the pump and the valve occurs during the requested brake pressure build-up in the at least one wheel brake cylinder, using the electromechanical brake booster.

5. The sensor device as recited in claim 4, wherein the at least one provided signal includes at least one third piece of information concerning a prior accelerator pedal actuation, and the electronic device is designed for disallowing the at least one standard mode, taking into account the third piece of information, if a time interval between the accelerator pedal actuation and the requested brake pressure build-up in the at least one wheel brake cylinder using the electromechanical brake booster is less than a predefined minimum time interval.

6. The sensor device as recited in claim 1, wherein the electronic device is designed for determining the actual variable with regard to the torque loss of the motor of the electromechanical brake booster additionally based on at least one of: i) at least one environmental condition, and ii) at least one operating parameter of the electromechanical brake booster.

7. A braking system comprising: an electromechanical brake booster which includes a sensor device, an electronic device wherein the electronic device is configured to ascertain, based on at least one provided signal, when a user of the braking system requests, by actuating a brake actuation element of the braking system a brake pressure build-up in at least one wheel brake cylinder of the braking system using the electromechanical brake booster during the requested brake pressure build-up in at least one wheel brake cylinder, using the electromechanical brake booster, an actual variable with regard to a torque loss of the motor of the electromechanical brake booster, taking into account at least one of: i) at least one provided sensor variable with regard to a motor torque of a motor of the electromechanical brake booster, ii) a change over time of a rotation speed of the motor of the electromechanical brake booster, and iii) a master brake cylinder pressure that is present in a master brake cylinder of the braking system and a controller, wherein the controller is configured to control the electromechanical brake booster based on the actual variable determined by the electronic device.

8. The braking system as recited in claim 7, wherein the control by the controller is for at least one of: i) autonomous braking, ii) an emergency brake application, iii) a driver assistance function, iv) braking with an underlying control of an ABS/ESP system of the braking system, v) a recirculation pump operation, vi) an evacuation of the master brake cylinder of the braking system, and vii) a blending operation.

9. A method for ascertaining a torque loss of an electromechanical brake booster of a braking system, comprising:
ascertaining when a user of the braking system requests, by actuating a brake actuation element of the braking system, a brake pressure build-up in at least one wheel brake cylinder of the braking system, using the electromechanical brake booster and determining, and
during the requested brake pressure build-up in the at least one wheel brake cylinder, using the electromechanical brake booster, an actual variable with regard to the torque loss of the motor of the electromechanical brake booster, taking into account at least one of: i) at least one provided sensor variable with regard to a motor torque of a motor of the electromechanical brake booster, ii) a change over time of a rotation speed of the motor of the electromechanical brake booster, and iii) a master brake cylinder pressure that is present in a master brake cylinder of the braking system.

10. The method as recited in claim 9, further comprising: ascertaining whether the requested brake pressure build-up in the at least one wheel brake cylinder using the electromechanical brake booster, corresponds to at least one predefined standard mode, wherein the actual variable is determined only if the requested brake pressure build-up in the at least one wheel brake cylinder using the electromechanical brake booster corresponds to the at least one predefined standard mode.

11. The method as recited in claim 10, further comprising: ascertaining whether at least one of: i) an average actuation speed of the actuation of a brake actuation element, ii) a maximum actuation speed of the actuation of a brake actuation element, iii) an average change over time of the actuation speed of the actuation of a brake actuation element, iv) a maximum change over time of the actuation speed of the actuation of a brake actuation element, v) an average actuation intensity of the actuation of a brake actuation element, and vi) a maximum actuation intensity of the actuation of a brake actuation element, is within at least one value range which is predefined as the at least one standard mode.

12. The method as recited in claim 10, further comprising: ascertaining an active operation of at least one of: i) at least one pump of the braking system, and ii) at least one valve of the braking system occurs during the requested brake pressure build-up in the at least one wheel brake cylinder, using the electromechanical brake booster, and the at least one standard mode is optionally disallowed depending on the active operation.

13. The method as recited in claim 12, wherein the at least one standard mode is disallowed if a time interval between a prior accelerator pedal actuation and the requested brake pressure build-up in the at least one wheel brake cylinder using the electromechanical brake booster is less than a predefined minimum time interval.

14. The method as recited in claim 9, wherein the determination of the actual variable with regard to the torque loss of the motor of the electromechanical brake booster additionally based on at least one of: i) at least one environmental condition, and ii) at least one operating parameter of the electromechanical brake.

15. A method for operating an electromechanical brake booster of a braking system, comprising:
ascertaining, at least once, an actual variable with regard to a torque loss of the electromechanical brake booster including ascertaining when a user of the braking system requests, by actuating a brake actuation element of the braking system, a brake pressure build-up in at least one wheel brake cylinder of the braking system using the electromechanical brake booster determining, during the requested brake pressure build-up in the at least one wheel brake cylinder, using the electromechanical brake booster, determining an actual variable with regard to the torque loss of the motor of the electromechanical brake booster, taking into account at least one of: i) at least one provided sensor variable with regard to a motor torque of a motor of the electromechanical brake booster, ii) a change over time of a rotation speed of the motor of the electromechanical brake booster, and iii) a master brake cylinder pressure that is present in a master brake cylinder of the braking system; and
taking into account the at least one determined actual variable at least during control of at least one of: i) an electromechanical brake booster for autonomous braking, ii) an emergency brake application, iii) a driver assistance function, iv) braking with an underlying control of an ABS/ESP system of the braking system, v) a recirculation pump operation, vi) an evacuation of the master brake cylinder of the braking system, and vii) a blending operation.

16. The method as recited in claim 12, wherein the standard mode is disallowed when the active operation of the at least one of the pump and the valve occurs during the requested brake pressure build-up in the at least one wheel brake cylinder, using the electromechanical brake booster.

* * * * *